(12) United States Patent
Guo et al.

(10) Patent No.: US 9,238,746 B2
(45) Date of Patent: Jan. 19, 2016

(54) INK SET HAVING MIX COLOR GLOSS UNIFORMITY

(75) Inventors: Dennis Z. Guo, San Diego, CA (US); Yubai Bi, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 327 days.

(21) Appl. No.: 13/880,851

(22) PCT Filed: Oct. 22, 2010

(86) PCT No.: PCT/US2010/053722
§ 371 (c)(1),
(2), (4) Date: Apr. 22, 2013

(87) PCT Pub. No.: WO2012/054056
PCT Pub. Date: Apr. 26, 2012

(65) Prior Publication Data
US 2013/0208046 A1 Aug. 15, 2013

(51) Int. Cl.
*C09D 11/40* (2014.01)
*C09D 11/324* (2014.01)
*B41J 2/21* (2006.01)
*C09D 11/322* (2014.01)

(52) U.S. Cl.
CPC . *C09D 11/40* (2013.01); *B41J 2/21* (2013.01); *B41J 2/211* (2013.01); *B41J 2/2107* (2013.01); *C09D 11/322* (2013.01); *C09D 11/324* (2013.01)

(58) Field of Classification Search
CPC ............ B41J 2/01; B41J 2/17503; B41J 2/21; B41J 2/2107; B41J 2/0057; B41J 2/05; B41J 2/1433; B41J 2/15; B41J 2/155; B41J 2/17; B41J 2/1755; B41J 2/17593; B41J 2/211; B41J 2/2114; B41J 2/2117; B41J 2/2056; C09D 11/30; C09D 11/32; C09D 11/322; C09D 11/324; C09D 11/40; C09D 11/005; C09D 11/328; C09D 11/36; C09D 11/38; C09D 11/52; C09D 11/54
USPC ................... 347/1, 95–105, 9–22, 56, 86, 88; 106/31.13, 31.6, 31.65, 31.85, 31.27, 106/31.77, 31.75; 523/160, 161
See application file for complete search history.

(56) References Cited

U.S. PATENT DOCUMENTS

| | | |
|---|---|---|
| 5,837,766 A | 11/1998 | Metro et al. |
| 7,655,708 B2 | 2/2010 | House et al. |
| 2003/0189626 A1 | 10/2003 | Kataoka et al. |
| 2004/0030001 A1 | 2/2004 | Ma et al. |
| 2005/0256225 A1 * | 11/2005 | Viola .............................. 523/160 |
| 2009/0033728 A1 | 2/2009 | Ma et al. |
| 2009/0080002 A1 | 3/2009 | Nakano et al. |
| 2009/0176070 A1 | 7/2009 | Goto et al. |
| 2009/0233199 A1 | 9/2009 | Nozaki et al. |
| 2010/0034972 A1 | 2/2010 | Mukae et al. |

OTHER PUBLICATIONS

International Search Report for PCT/US2010/053722, dated Jul. 7, 2011, for Applicant Hewlett-Packard Development Company, L.P. et al.

* cited by examiner

*Primary Examiner* — Matthew Luu
*Assistant Examiner* — Rut Patel
(74) *Attorney, Agent, or Firm* — Thorpe, North & Western L.L.P.

(57) ABSTRACT

The present disclosure provides ink sets and related methods mix color gloss uniformity. The ink set can include a black ink with a black pigment having a particle size of about 14 nm to about 16 nm, a DBP absorption of about 80 ml/100 g to about 350 ml/100 g, and a BET surface area of about 160 $m^2/g$ to about 1600 $m^2/g$. The ink set can also include pigmented magenta ink, pigmented cyan ink, and pigmented yellow ink. As a whole, the ink set can have a mix color gloss uniformity of at least 7.

20 Claims, No Drawings

INK SET HAVING MIX COLOR GLOSS UNIFORMITY

BACKGROUND

There are several reasons that ink jet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to ink jet ink chemistry, the majority of commercial ink jet inks are water-based. Thus, their constituents are generally water-soluble, as in the case with many dyes, or water dispersible, as in the case with pigments. Furthermore, ink jet inks have low viscosity to accommodate high frequency jetting and firing chamber refill processes common to thermal ink jet architecture.

DETAILED DESCRIPTION

Before the present disclosure is described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, "alkyl" refers to a branched, unbranched, or cyclic saturated hydrocarbon group, which typically, although not necessarily, contains from 1 to about 50 carbon atoms, or 1 to about 40 carbon atoms, or 1 to about 30 carbon atoms for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. The term "lower alkyl" refers to an alkyl group having from 1 to 6 carbon atoms. The term "higher alkyl" refers to an alkyl group having more than 6 carbon atoms, for example, 7 to about 50 carbon atoms, or 7 to about 40 carbon atoms, or 7 to about 30 carbon atoms or more. As used herein, "substituted alkyl" refers to an alkyl substituted with at least one substituent group. The term "heteroalkyl" refers to an alkyl in which at least one carbon atom is replaced with a heteroatom. If not otherwise indicated, the term "alkyl" includes unsubstituted alkyl, substituted alkyl, lower alkyl, and heteroalkyl.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, and thioaryl.

As used herein, "aryl" refers to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more. Aryl groups include, for example, phenyl, naphthyl, anthryl, phenanthryl, biphenyl, diphenylether, diphenylamine, and benzophenone. The term "substituted aryl" refers to an aryl group comprising at least one substituent group. The term "heteroaryl" refers to an aryl group in which at least one carbon atom is replaced with a heteroatom. If not otherwise indicated, the term "aryl" includes unsubstituted aryl, substituted aryl, and heteroaryl.

As used herein, "photo paper" refers to a paper with photographic quality in feel and gloss appearance. Photo paper includes a photobase and one or more ink-absorbing layers on top of one size of the photobase. Photobase is typically a highly sized base paper with polyethylene or polypropylene extruded on each size. In one embodiment, the photo paper can be HP Advanced Glossy Photo Paper.

As used herein, "mix color gloss uniformity" is determined by printing images from a magenta ink mixed with a black ink, a cyan ink mixed with the black ink, and a yellow ink mixed with the black ink, each at a 1:1 weight ratio on photo paper and measured for 20° gloss. Each gloss measurement is then averaged, thereby providing an average gloss uniformity. The average gloss uniformity is then divided by the standard deviation to produce a mix color gloss uniformity value.

As used herein, "gloss" refers generally to the amount of light reflected by an object's surface, such as, e.g., an ink jet media surface. Gloss can be quantified and measured relative to specific specular angles from an object surface. The specular angle is the angle equal to but opposite the angle of incidence. This specular light is responsible for the highlights visible on shiny materials. When quantifying gloss, it can be measured at angles of 20 degrees, 60 degrees, and 85 degrees off of the normal. Gloss measurements are indicated by gloss units in relation to the angle used for measurement.

As used herein, "20° gloss" is the gloss of an image measured by using "BYK-Gardner micro-TRI-gloss" meter with incident angle set at 20°.

As used herein, "standard deviation" is the calculated standard deviation of the measurements of the average gloss.

As used herein, "haze" generally refers to a cloudy or smoky appearance to an image resulting from light scattering off of the surface of the print. For the purposes of the present disclosure, haze is measured by "BYK-Gardner micro haze plus" meter.

As used herein, "DBP absorption" is determined by the amount of dibutyl phthalate (DBP) a given mass of a pigment can absorb before reaching a specified viscous paste according to ASTM D-2414. In one example, the pigment measured can be a carbon black pigment.

As used herein, "BET surface area" refers to the surface area of a pigment as measured by the BET (Brunauer, Emmet, and Teller) nitrogen absorption method according to ASTM D-6556.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

It has been recognized that it would be advantageous to develop an ink set that provides good mix color gloss uniformity suitable over a wide variety of applications. In accordance with this, compositions and methods described herein can include an ink set comprising a black ink, a magenta ink, a cyan ink, and a yellow ink that can provide good mix color gloss uniformity when printed on recording media. It is noted that when discussing the present compositions and methods, each of these discussions can be considered applicable to each of these embodiments, whether or not they are explicitly discussed in the context of that embodiment. Thus, for example, in discussing a black ink used in an ink set, such a black ink can also be used in a method for manufacturing an ink set or a method of improving a mix color gloss uniformity of an ink set, and vice versa.

In light of the above, an ink jet ink set having mix color gloss uniformity can comprise a black ink including a black pigment, a magenta ink including a magenta pigment, a cyan ink including a cyan pigment, and a yellow ink including a yellow pigment. The black pigment can have a particle size of about 14 nm to about 16 nm, a DBP absorption of about 80 ml/100 g to about 350 ml/100 g, and a BET surface area of about 160 $m^2$/g to about 1600 $m^2$/g. The ink set can also have a mix color gloss uniformity of at least 7, as defined herein.

Additionally, a method of manufacturing an ink set can comprise formulating a magenta ink by admixing a first ink vehicle with a magenta pigment; formulating a cyan ink by admixing a second ink vehicle with a cyan pigment; formulating a yellow ink by admixing a third ink vehicle with a yellow pigment; and formulating a black ink by admixing a fourth ink vehicle with a black pigment. The black pigment can have a particle size of about 14 nm to about 16 nm, a DBP absorption of about 80 ml/100 g to about 350 ml/100 g, and a BET surface area of about 160 $m^2$/g to about 1600 $m^2$/g. The ink set can be formulated to have a mix color gloss uniformity of at least 7.

In another embodiment, a method of generating an image with mix color gloss uniformity can comprise matching a black ink with a magenta ink, a cyan ink, and a yellow ink to form the ink set with a mix color gloss uniformity of at least 7, and ink jet printing a color image by mixing the black ink with each of the magenta ink, the cyan ink, and the yellow ink.

The compositions and methods described herein can provide good mix color gloss uniformity measured as images printed separately from each of a magenta ink with a black ink, a cyan ink with the black ink, and a yellow ink with the black ink in a 1:1 ratio by weight on photo paper. In one embodiment, the compositions and methods described herein can provide superior mix color gloss uniformity measured as a mix color gloss uniformity of at least 9. In another embodiment, the compositions and methods described herein can provide excellent mix color gloss uniformity measured as a mix color gloss uniformity of at least 11.

Other inks may also be used in addition to the black ink, the magenta ink, the cyan ink, and the yellow ink. In one example, a light or pale magenta can be used as the magenta ink or in addition to the magenta ink. In another example, a light or pale cyan ink can be used as the cyan ink or in addition to the cyan ink. In yet another example, a light or pale magenta ink can be used as the magenta ink and a light or pale cyan ink can be used as the cyan ink. Other inks that can be used include without limitation blue inks, red inks, orange inks, violet inks, green inks, gray inks, light gray inks, etc. Such inks can include a pigment with an ink vehicle as described herein.

Generally, the black ink includes a black pigment in an ink vehicle, although other colorants may also be present in the black ink, e.g., to improve neutrality of the black ink in some examples. In one example, the black pigment can be carbon black. While the black ink can include various black pigments, in one example, the black pigment can have a primary particle size of about 10 nm to 20 nm. In a more detailed aspect, the particle size can be from about 14 nm to about 16 nm. Additionally, the black pigment can have a DBP absorption of about 80 ml/100 g to about 350 ml/100 g. In one particular aspect, the DBP absorption can be from about 80 ml/100 g to about 130 ml/100 g. Further, the black pigment can have a BET surface area of about 160 $m^2$/g to about 1600 $m^2$/g. In one specific aspect, the BET surface area can be from about 160 $m^2$/g to about 350 $m^2$/g. Exemplary pigments that can be used include certain BLACK PEARLS® 2000 from Cabot, having a DBP absorption of about 330 ml/100 g and a BET surface area of about 1500 $m^2$/g.

The present inks sets can also provide acceptable levels of haze. In one embodiment, the haze can be less than 450 as measured using a BYK-Gardner micro haze plus" meter as described herein. In another embodiment, the haze can be less than 415.

The ink vehicles of the various inks in the ink set can be the same or different. In one embodiment, the black ink can have a unique ink vehicle compared to the other inks in the ink set, and in another embodiment, it can have a common ink vehicle with one or more of the other inks in the ink set.

In one specific embodiment, the present inks can also include a pigment dispersed by an acrylic dispersant. The acrylic dispersant can include acrylic polymers having hydrophilic monomers including acid monomers, and hydrophobic monomers. Hydrophobic monomers that can be polymerized in the acrylic dispersant include, without limitation, styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, combinations thereof, derivatives thereof, and mixtures thereof.

Acidic monomers can be present in the acrylic dispersant at from about 0.1 wt % to about 30 wt %. Acidic monomers that can be used in the acrylic dispersant include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

Additionally, the acrylic dispersants can include reactive surfactants such as functionalized ethylene glycol acrylates, including the SIPOMER® series of surfactants from Rhodia. Other non-limiting examples of reactive surfactants include HITENOL™ (polyoxyethylene alkylphenyl ether ammonium sulfate) and NOIGEN™ (polyoxyethylene alkylphenyl ether) reactive surfactants commercially available from Dai-Ichi Kogyo Seiyaku Co., Ltd. of Japan; TREM® (sulfosuccinates) commercially available from Henkel; and the MAX-EMUL® (anionic phosphate ester) reactive surfactants commercially available from Uniqema of the Netherlands. Suitable grades of some of the materials listed above may include HITENOL BC-20, NOIZEN RN-30, TREM LT-40, and MAXEMUL 6106 and 6112.

The ink jet ink compositions of the present disclosure can also be suitable for use on many types of substrates of recording media, including but not limited to vinyl media, cellulose-based paper media, various cloth materials, polymeric materials (non-limitative examples of which include polyester white film or polyester transparent film), photopaper (non-limiting examples of which include polyethylene or polypropylene extruded on one or both sides of paper), metals, and/or mixtures or composites thereof. A non-limiting example of a suitable metal material is a metal in foil form made from, for example, at least one of aluminum, silver, tin, copper, alloys thereof, and/or mixtures thereof.

Typical ink vehicle formulations described herein can include water, and can further include co-solvents present in total at from 0.1 wt % to 30 wt %, depending on the jetting architecture, though amounts outside of this range can also be used. Further, non-ionic, cationic, and/or anionic surfactants can be present, ranging from 0.01 wt % to 10 wt %. In addition to the colorant, the balance of the formulation can be purified water, or other vehicle components known in the art, such as biocides, viscosity modifiers, materials for pH adjustment, sequestering agents, preservatives, and the like. In one embodiment, the ink vehicle can be predominantly water and can be referred to as an aqueous liquid vehicle.

The present inks can also include a binder, such as for example, a polyurethane binder. The polyurethane binder can comprise polymerized monomers including a polyether polyol, a diisocyanate, and an acid polyol. Additionally, the polyurethane binder can have a $M_w$ from about 30K to 100K and an acid number from 30 to 60. In one embodiment, the $M_w$ can be from about 40K to about 45K and the acid number can be from about 53 to about 57.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

EXAMPLES

The following examples illustrate some embodiments of the present ink compositions and methods that are presently known. However, it is to be understood that the following are only exemplary or illustrative of the application of the principles of the present compositions, devices, and methods. Numerous modifications and alternative compositions, methods, and devices may be devised by those skilled in the art without departing from the spirit and scope of the present compositions and methods. The appended claims are intended to cover such modifications and arrangements. Thus, while the present ink compositions and methods have been described above with particularity, the following examples provide further detail in connection with what are presently deemed to be the acceptable embodiments.

Example 1

Black Ink Preparations

Three black inks were prepared with pigments set forth in Table 1. Specifically, a first black ink having a pigment primary particle size of 14 nm, a BET surface area of 300 m$^2$/g, and a DBP absorption of 95 ml/100 g, was prepared by dispersing a carbon black pigment in an aqueous liquid vehicle having the components of which are outlined in Table 2. The second and third black inks were prepared in the same fashion with the same vehicle components as listed in Table 2, except that the second and third black inks used different pigments.

TABLE 1

| Ink | Ink 1 | Ink 2 | Ink 3 |
|---|---|---|---|
| Black Pigment | Pigment 1 (PRINTEX ® 90 from Evonik) | Pigment 2 (NIPEX ® 180 IQ from Evonik) | Pigment 3 |
| Primary Particle Size (nm) | 14 | 15 | 16 |
| BET Surface Area (m$^2$/g) | 300 | 260 | 250 |
| DBP Absorption (ml/100 g) | 95 | 100 | 105 |

TABLE 2

| Vehicle Component | Amounts (wt %) |
|---|---|
| Heterocyclic solvent | 3-11 |
| Buffer | 0.5-1 |
| Anionic surfactant | 0.1-0.5 |
| Non-ionic surfactant | 0.1-0.5 |
| Fluoro surfactant | 0.01-0.2 |
| Biocide | 0.01-0.2 |
| Polyurethane resin | 0.1-2.5 |
| Styrene acrylic resin | 0.5-2.5 |
| Glycol | 1-5 |
| Total pigment | 0.5-5 |
| Water | balance |

Example 2

Color Ink Preparations

Four color inks were prepared by dispersing a color pigment in an aqueous liquid vehicle, the components of which are outlined in Table 3.

TABLE 3

| Vehicle Component | Magenta | Light Magenta | Yellow | Light Cyan |
|---|---|---|---|---|
| Heterocyclic solvent | 3-11 | 3-11 | 3-11 | 3-11 |
| Buffer | 0.5-1 | 0.5-1 | 0.5-1 | 0.5-1 |
| Anionic surfactant | 0.1-0.5 | 0.1-0.5 | 0.1-0.5 | 0.1-0.5 |

TABLE 3-continued

| Vehicle Component | Magenta | Light Magenta | Yellow | Light Cyan |
|---|---|---|---|---|
| Non-ionic surfactant | 0.1-0.5 | 0.1-0.5 | 0.1-0.5 | 0.1-0.5 |
| Fluoro surfactant | 0.01-0.2 | 0.01-0.2 | 0.01-0.2 | 0.01-0.2 |
| Biocide | 0.01-0.2 | 0.01-0.2 | 0.01-0.2 | 0.01-0.2 |
| Polyurethane resin | 0.1-2.5 | 0.1-2.5 | 0.1-2.5 | 0.1-2.5 |
| Styrene acrylic resin | 0.5-2.5 | 0.5-2.5 | 0.5-2.5 | 0.5-2.5 |
| Glycol | 1-5 | 1-5 | 1-5 | 1-5 |
| Pigment - Yellow pigment dispersion | 0 | 0 | 2-5 | 0 |
| Pigment - Cyan pigment dispersion | 0 | 0 | 0 | 0.5-2 |
| Pigment - Magenta pigment dispersion | 2-5 | 0.5-2 | 0 | 0 |
| Violet pigment 19 | | | | |
| Water | balance | balance | balance | balance |

Example 3

Comparative Black Inks

Five comparative black inks were prepared with the ink vehicle as outlined in Table 2 and as discussed in Example 1, except that 5 comparative black pigments were used as outlined in Table 4.

TABLE 4

| | Ink | | | | |
|---|---|---|---|---|---|
| | Comparative Ink 1 | Comparative Ink 2 | Comparative Ink 3 | Comparative Ink 4 | Comparative Ink 5 |
| Black Pigment | Pigment 4 | Pigment 5 (PRINTEX ® 85 from Evonik) | Pigment 6 (PRINTEX ® 75 from Evonik) | Pigment 7 (Black Pigment 3) | Pigment 8 (BP880 from Cabot) |
| Primary Particle Size (nm) | 15 | 16 | 17 | 20 | 16 |
| BET Surface Area (m²/g) | 320 | 200 | 150 | 140 | 220 |
| DBP Absorption (ml/100 g) | 64 | 48 | 49 | 131 | 105 |

Example 4

Mix Color Gloss Uniformity Measurements

The black inks from Example 1 and the comparative black inks from Example 3 were printed using a HP Desi4gnjet Z3200 photo printer with each of the color inks from Example 2 in a 1:1 ratio by weight on HP Advanced Glossy Photo Paper. Data for three types of ink sets were as follows: Ink set 1 (pK, Y, M, lc), Ink set 2 (pK, Y, lm, lc), and Ink set 3 (pK, M, Y, lc, lm) is presented in Table 5 below. The difference between each of the ink sets is the type of black pigment used.

TABLE 5

| | Comparative Black Inks of Example 3 | | | | | Black Inks of Example 1 | | |
|---|---|---|---|---|---|---|---|---|
| | Black Ink | | | | | | | |
| | 1 | 2 | 3 | 4 | 5 | 1st | 2nd | 3rd |
| Gloss 20° pK-M | 69.24 | 76.79 | 70.79 | 28.58 | 61.75 | 61.09 | 50.43 | 55.38 |
| Gloss 20° pK-Y | 51.27 | 43.32 | 37.15 | 37.28 | 53.18 | 56.26 | 60.99 | 55.32 |
| Gloss 20° pK-lm | 64.28 | 60.54 | 61.58 | 24.53 | 75.25 | 64.69 | 56.61 | 60.5 |
| Gloss 20° pK-lc | 58.24 | 48.7 | 46.38 | 20.39 | 53.01 | 54.96 | 48.34 | 46.01 |
| AVG Gloss for INK SET 1 (pK-M, pK-Y, pK-lc) | 59.58 | 56.27 | 51.44 | 28.75 | 55.98 | 57.44 | 53.25 | 52.24 |
| Standard Deviation Ink Set 1 | 9.06 | 17.97 | 17.38 | 8.45 | 5.00 | 3.23 | 6.78 | 5.39 |
| Mix Color Gloss Uniformity Ink Set 1 | 6.58 | 3.13 | 2.96 | 3.40 | 11.20 | 17.78 | 7.85 | 9.69 |
| AVG Gloss for INK SET 2 (pK-lm, pK-Y, pK-lc) | 57.93 | 50.85 | 48.37 | 27.40 | 60.48 | 58.64 | 55.31 | 53.94 |
| Standard Deviation Ink Set 2 | 6.51 | 8.81 | 12.34 | 8.80 | 12.79 | 5.28 | 6.42 | 7.34 |
| Mix Color Gloss Uniformity Ink Set 2 | 8.90 | 5.77 | 3.92 | 3.11 | 4.73 | 11.10 | 8.61 | 7.35 |
| AVG Gloss for INK SET 3 (pK-M, pK-Y, pK-lc, pK-lm) | 60.76 | 57.34 | 53.98 | 27.70 | 60.80 | 59.25 | 54.09 | 54.30 |
| Standard Deviation Ink Set 3 | 7.76 | 14.83 | 15.07 | 7.21 | 10.46 | 4.48 | 5.79 | 6.04 |
| Mix Color Gloss Uniformity Ink Set 3 | 7.83 | 3.87 | 3.58 | 3.84 | 5.81 | 13.21 | 9.35 | 8.99 | pK—black ink, M—magenta ink, Y—yellow ink, lm—light magenta ink, and lc—light cyan ink As can be seen in Table 5, the inks sets of the present disclosure (Inks 1-3) provided consistent mix color gloss uniformity of 7 or more, while the comparative inks did not. Additionally, some of the ink sets were able to provide superior (≥9) and excellent (≥11) mix color gloss uniformity.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. An ink set having mix color gloss uniformity, comprising:
   a black ink including a black pigment, the black pigment having a particle size of about 14 nm to about 16 nm, a DBP absorption of about 80 ml/100 g to about 350 ml/100 g, and a BET surface area of about 160 m2/g to about 1600 m2/g;
   a magenta ink including a magenta pigment;
   a cyan ink including a cyan pigment; and
   a yellow ink including a yellow pigment,
   wherein the ink set has a mix color gloss uniformity of at least 7 when printed by mixing each of the magenta ink, cyan ink, and yellow ink with the black ink at a 1:1 weight ratio.

2. The ink set of claim 1, wherein the black pigment has a DBP absorption of about 80 ml/100 g to about 130 ml/100 g.

3. The ink set of claim 1, wherein the black pigment has a BET surface area of about 160 m2/g to about 350 m2/g.

4. The ink set of claim 1, wherein the ink set provides an image having a haze of less than 450.

5. The ink set of claim 1, wherein the black pigment is a carbon black pigment.

6. The ink set of claim 1, wherein the magenta ink is a light magenta ink.

7. The ink set of claim 1, wherein the mix color gloss uniformity is at least 9.

8. The ink set of claim 1, wherein the mix color gloss uniformity is at least 11.

9. The ink set of claim 1, wherein the black ink includes an ink vehicle that is the same as an ink vehicle from one of the cyan ink, the magenta ink, and the yellow ink.

10. The ink set of claim 1, wherein the black ink includes an ink vehicle that is different than ink vehicles from the cyan ink, the magenta ink, and the yellow ink.

11. The ink set of claim 1, wherein the cyan ink is a light cyan ink.

12. The ink set of claim 1, wherein the magenta ink is a light magenta ink, and wherein the cyan ink is a light cyan ink.

13. A method of manufacturing an ink set, comprising:
   formulating a magenta ink by admixing a first ink vehicle with a magenta pigment;
   formulating a cyan ink by admixing a second ink vehicle with a cyan pigment; and
   formulating a yellow ink by admixing a third ink vehicle with a yellow pigment;
   formulating a black ink by admixing a fourth ink vehicle with a black pigment, the black pigment having a particle size of about 14 nm to about 16 nm, a DBP absorption of about 80 ml/100 g to about 350 ml/100 g, and a BET surface area of about 160 m2/g to about 1600 m2/g,
   wherein the ink set is formulated to have a mix color gloss uniformity of at least 7 when printed by mixing each of the magenta ink, cyan ink, and yellow ink with the black ink at a 1:1 weight ratio.

14. The method of claim 13, wherein the black pigment has a DBP absorption of about 80 ml/100 g to about 130 ml/100 g, a BET surface area of about 160 m2/g to about 350 m2/g, and the ink set provides an image having a haze of less than 450.

15. The method of claim 13, wherein the mix color gloss uniformity is at least 9.

16. A method of generating an image with mix color gloss uniformity, comprising:
   matching a black ink with a magenta ink, a cyan ink, and a yellow ink to form the ink set with a mix color gloss uniformity of at least 7; and
   ink jet printing a color image by mixing the black ink with each of the magenta ink, the cyan ink, and the yellow ink.

17. The method of claim 16, wherein the black ink includes a black pigment having a particle size of about 14 nm to about 16 nm, a DBP absorption of about 80 ml/100 g to about 350 ml/100 g, and a BET surface area of about 160 m2/g to about 1600 m2/g.

18. An ink set having mix color gloss uniformity, comprising:
   a black ink including a black pigment, the black pigment having a particle size of about 14 nm to about 16 nm, a DBP absorption of about 80 ml/100 g to about 350 ml/100 g, and a BET surface area of about 160 m2/g to about 1600 m2/g;
   a magenta ink including a magenta pigment;
   a cyan ink including a cyan pigment; and
   a yellow ink including a yellow pigment,
   wherein the ink set has a mix color gloss uniformity of at least 7, and wherein at least one of the magenta ink is a light magenta ink, the cyan ink is a light cyan ink, or both the magenta ink is a light magenta ink and the cyan ink is a light cyan ink.

19. The ink set of claim 18, wherein the black ink includes an ink vehicle that is the same as an ink vehicle from one of the cyan ink, the magenta ink, and the yellow ink.

20. The ink set of claim 18, wherein the black ink includes an ink vehicle that is different than ink vehicles from the cyan ink, the magenta ink, and the yellow ink.

* * * * *